United States Patent [19]

Lasota et al.

[11] Patent Number: 4,655,256
[45] Date of Patent: Apr. 7, 1987

[54] THREADED END PROTECTOR AND COMPONENT

[75] Inventors: Robert E. Lasota, Aliquippa; William Haibach, Erie, both of Pa.

[73] Assignee: Ampco-Pittsburgh Corporation, Pittsburgh, Pa.

[21] Appl. No.: 691,422

[22] Filed: Jan. 14, 1985

[51] Int. Cl.$^4$ .............................................. F16L 57/00
[52] U.S. Cl. .................................................... 138/96 T
[58] Field of Search .............. 138/96 T; 215/217, 218, 215/219, 220, 318

[56] References Cited

U.S. PATENT DOCUMENTS

| | | | |
|---|---|---|---|
| 2,225,754 | 12/1940 | Mirfield | 138/96 T |
| 2,864,519 | 12/1958 | Crabbe | 215/217 |
| 2,980,274 | 4/1961 | Gould | 215/220 |
| 3,531,008 | 9/1970 | Achabal et al. | 215/220 |
| 4,126,338 | 11/1978 | Coel et al. | 285/392 X |

Primary Examiner—Stephen Marcus
Assistant Examiner—Mark Thronson
Attorney, Agent, or Firm—Robert D. Yeager; Christine Ethridge

[57] ABSTRACT

Protectors are provided for both internally and externally threaded ends of a tubular member. Each protector includes a plastic and a metal member. The plastic member of each protector defines threads which are adapted to threadedly engage threads of the tubular member. Each metal member defines a projection that is adapted to be received by a recess formed in the plastic member. Each plastic member defines a channel that guides the metal projection to the recess as the metal and plastic members are joined together.

8 Claims, 12 Drawing Figures

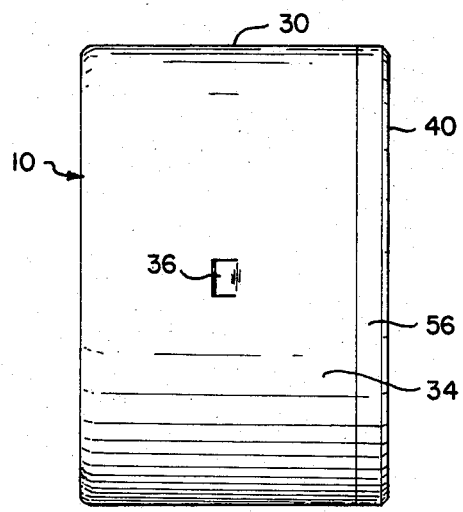
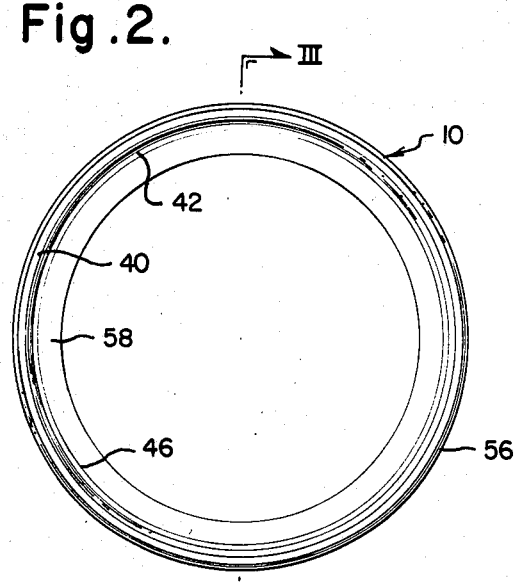
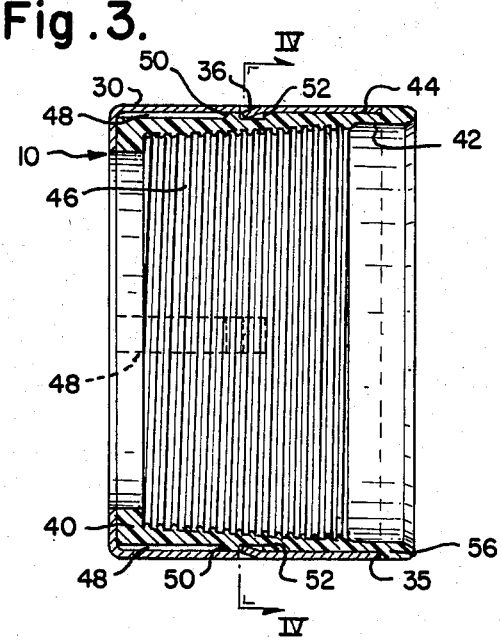
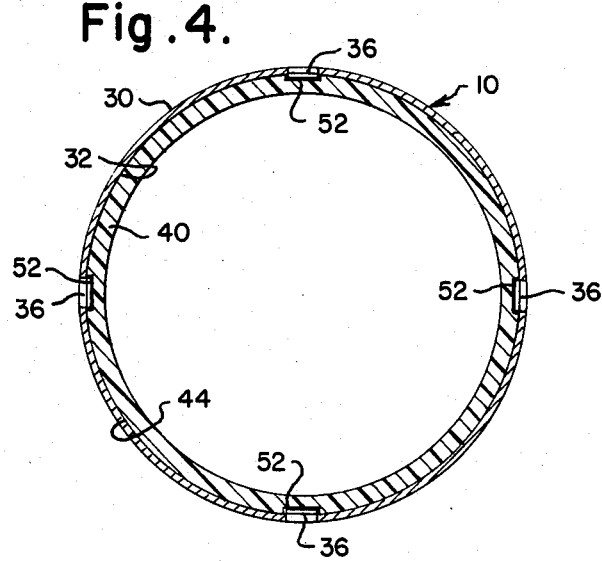
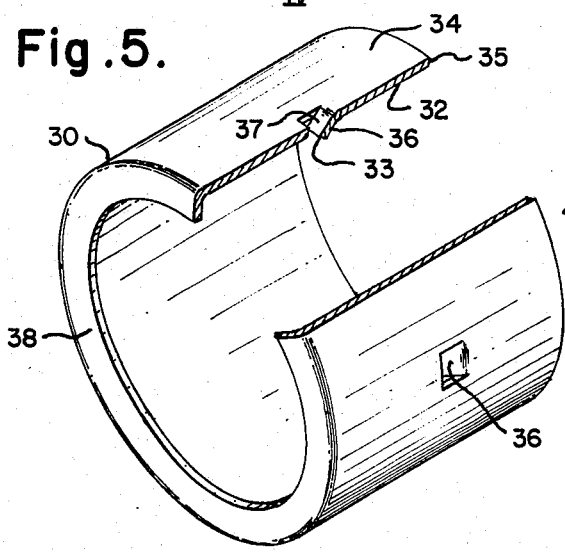
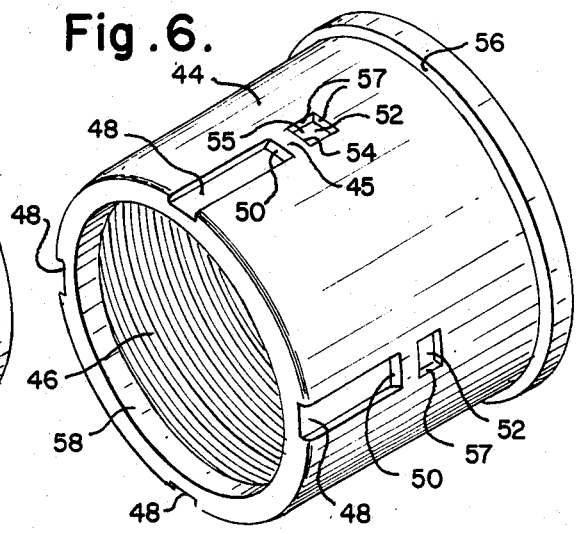

THREADED END PROTECTOR AND COMPONENT

BACKGROUND OF THE INVENTION

1. Field of the Invention

The present invention relates to threaded end protectors for pipes and, more particularly, to a composite end protector having an improved mechanical locking arrangement.

2. Description of the Prior Art

The threaded ends of pipe must be protected from damage during storage and transit. Typically, end protectors have been manufactured from plastic, metal or a combination of the two. The threads of all-metal protectors can damage the pipe threads if misapplied. Further, the metal threads of metal protectors do not prevent the exposure of the pipe threads to moisture and, thus, do not prevent corrosion of the pipe protector. All-plastic end protectors, while eliminating the corrosion and thread damage problems, often become loose during prolonged periods due to expansion and contraction of the threads resulting from exposure to temperature extremes. Further, all-plastic protectors tend to become loose or broken due to deformation caused by impact.

Therefore, workers in the art have developed composite end protectors having a threaded plastic member shielding the threaded pipe end and a metal member shielding and reinforcing the plastic inner member. The metal and plastic members of the protector must be so joined together that they do not become separated from each other when the protector experiences impact during storage or transfer of the pipe, or during any of the numerous applications to or removals from the pipe end encountered during normal use. However, any technique used to join the plastic and metal members must permit economical manufacture and assembly of the protector.

Turk U.S. Pat. No. 4,157,100, which issued on June 5, 1979, discloses a composite threaded end protector having a detent in the metal outer member to mechanically join it to the plastic inner member. The metal detent pierces the plastic member to hold the two members together. The friction forces holding the detent in place can be readily overcome by the blows to the end protector which often occur during transit. The Turk disclosure does not indicate how the metal member is placed on the plastic member. If the detent is formed in the metal member before it is forced onto the plastic member, the metal detent may deform the threaded surface of the protector. When the end protector is placed on the pipe, the deformed threaded surface of the plastic member can strip away the grease which must be applied to the threads of the pipe. If the detent is formed by crimping after the metal member is placed on the plastic member, to maintain the integrity of the plastic threads, the crimping operation complicates the production process and thereby increases production costs.

Waldo et al. U.S. Pat. No. 4,487,228, which issued on Dec. 11, 1984, discloses a cup shaped composite end protector. Holes drilled through the metal outer member receive protrusions molded in the plastic inner member to mechanically join the two. The plastic member may be molded in the metal member to ensure proper alignment of the protrusions with the holes. Alternatively, the members can be formed separately and assembled by placing the metal member over the plastic member. The former method of assembly increases the cost of production and the latter method risks the misalignment of the protrusions and the holes. The plastic protrusions of the misaligned protector deform the threads of the protector, which can cause the grease-stripping problem identified above, and can defeat the seal provided by the threads and cause incomplete coupling between the pipe and protector. Further, the plastic protrusions can be sheared off by a heavy impact resulting in separation of the plastic from the metal member.

Coel et al. U.S. Pat. No. 4,126,338, which issued on Nov. 21, 1978, discloses an arrangement for providing mechanical coupling of plastic shaft sections. Protruding wedges having inwardly sloping ramps on the interior surface of the outer member engage complementary preformed recesses in the outer surface of the inner member. A separately formed keyway and axially extending rib are provided on the shaft sections to ensure alignment of each wedge with its corresponding recess.

It is an object of the present invention to provide a composite threaded end protector which has an improved arrangement for mechanically joining the inner and outer members. It is a further object of the present invention to provide a positive locking attachment which will not become dislodged or worn during transit. It is an object of the present invention to provide an arrangement of mechanical joinder which will facilitate proper alignment. Finally, it is an object of the present invention to provide such an improved end protector which can be produced economically.

SUMMARY OF THE INVENTION

The present invention provides a protector for the threaded end of a generally tubular member. The protector includes a member formed from a resilient material that defines a threaded portion that is adapted to threadedly engage a threaded end of the tubular member. The protector also includes a member formed from metal having a surface adapted to confront a corresponding surface of the resilient member. The metal member defines at least one projection on its confronting surface. The resilient member defines at least one recess adapted to receive the projection when the resilient and metal members are placed in predetermined positions relative to each other and the confronting surfaces confront each other. The metal member, the resilient member, the projection and the recess cooperate to secure together the resilient and metal members to form a unit when the projection is received by the recess and the members are in their predetermined positions. The resilient member further defines a channel adapted to receive the projection and guide the projection into the recess as the members are moved toward their predetermined positions.

The present invention also provides a plastic sleeve adapted to be joined with a corresponding metal sleeve to form a protector for the threaded end of a generally tubular member. The plastic sleeve defines a threaded portion on its inner surface. The threaded portion is adapted to threadedly engage a threaded end of the tubular member. The outer surface of the plastic sleeve defines a recess and a channel that extends from one end of the plastic sleeve to a point proximate the recess. The channel defines a ramp adapted to facilitate the transfer of a member from the channel into the recess.

The present invention also provides a plastic sleeve adapted to be joined with a corresponding metal sleeve to form a protector for the threaded end of a generally tubular member. The outer surface of the plastic sleeve defines a threaded portion. The threaded portion is adapted to threadedly engage the threaded end of the tubular member. The inner surface of the plastic sleeve defines a recess and a channel that extends from one end of the plastic sleeve to a point proximate the recess. The channel defines a ramp adapted to facilitate the transfer of a member from the channel into the recess.

BRIEF DESCRIPTION OF THE DRAWINGS

The following detailed description of the preferred embodiments can be understood better if reference is made to the drawings, in which:

FIG. 1 is a side elevation view of the preferred internally threaded protector provided by the present invention;

FIG. 2 is a top plan view of the protector shown in FIG. 1;

FIG. 3 is a section view of the end protector shown in FIG. 1 taken along the line III—III of FIG. 2;

FIG. 4 is a section view of the end protector taken along the line IV—IV of FIG. 3;

· FIG. 5 is an isometric view, partially cutaway, of the outer metal member of the end protector shown in FIG. 1;

FIG. 6 is an isometric view of the inner plastic member of the end protector shown in FIG. 1;

DETAILED DESCRIPTION OF THE PREFERRED EMBODIMENTS

Figure 7:
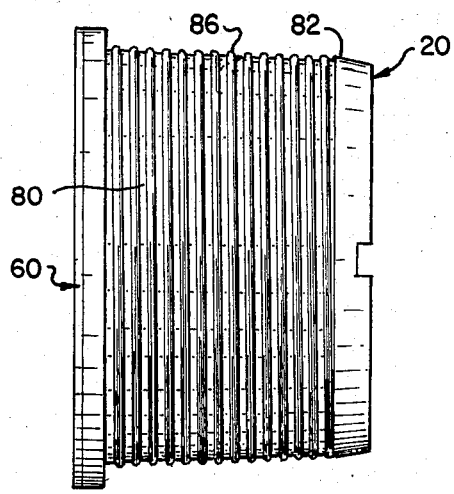
FIG. 7 is a side elevation view of the preferred externally threaded end protector provided by the present invention.
Figure 8:
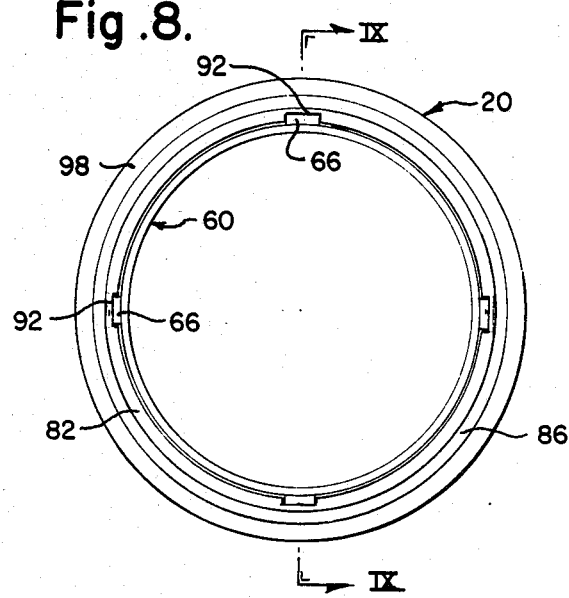
FIG. 8 is a top plan view of the end protector shown in FIG. 7.

FIGS. 1 through 12 illustrate the preferred embodiments of the present invention.

FIGS. 1 through 6 illustrate an internally threaded end protector 10 which is designed to protect the exterior threads on the end of a pipe. FIGS. 7 through 12 illustrate an externally threaded end protector 20 which is particularly adapted to shield the interior threads of an internally threaded pipe coupler threaded onto the end of an externally threaded pipe.

End protector 10 includes inner plastic member 40 and outer metal member 30. The shock absorbing, non-rusting inner plastic member 40 includes an interior surface 42 having threads 46 which engage the threaded end of the pipe (not shown) and exterior surface 44 having an approach channel 48, ramp 50 and locking recess 52 for facilitating the alignment and mechanical joinder of plastic member 40 to metal member 30. Preferably, metal member 30 is formed from suitably dimensioned metal pipe.

The outer member 30 includes interior surface 32 which confronts and fits closely against the exterior surface 44 of inner member 40. Outer member 30 also includes exterior surface 34. At least one projection or lug 36 partially cut away from member 30 protrudes inwardly from interior surface 32 for mechanical locking engagement with the locking recess 52 to secure the inner and outer members in predetermined positions to form a unit. As shown in FIG. 3, the free edge 33 of lug 36 is held against axial movement in one direction by the perpendicular abutment end 54 of recess 52. Lug 36 is angled inwardly to form a ramp surface 37. All the walls 57 and 54 of recess 52 are perpendicular to the floor 55 of recess 52 to ensure that lug 36 cannot escape from recess 52 radially or toward channel 48. Accordingly, radial movement of members 30 and 40 relative to each other is prevented. Preferably, there are a plurality of lugs 36 and complementary approach channels 48 and recesses 52 spaced in predetermined positions around the diameter of the end protector 10. As will be appreciated by those of ordinary skill in the art, some applications of the present invention will be sufficiently mechanically joined by one lug 36 appropriately positioned in one recess 52.

Inner member 40 includes flange 58 and a stop or lip 56. Outer member 30 includes flange 38 which covers flange 58 of inner member 40. Flanges 58 and 38 overlap the end of the pipe section to which the protector 10 is secured to protect it from damage. The opposite end 35 of outer member 30 defines a stop portion that rests on lip 56 of inner member 40 when members 30 and 40 are joined together. Lip 56 and end 35 cooperate to limit the extent to which member 40 can be inserted into member 30. The outer diameter of inner member 40 at lip 56 is preferably slightly greater than the outer diameter of outer member 30 at end 35 to reduce the possibility of the outer member 30 catching onto an object and being pulled off inner member 40 during transit of the pipe. During the molding process portions of the longitudinal walls of protector 10 set at different times due to the presence of channels 48, causing flange 58 to be non-planar, or "wavy". Accordingly, flange 58 exerts a torque against the pipe end when protector 10 is tightened on a pipe and flange 58 is forced flat against the pipe end, thus sealing the pipe threads against moisture.

Referring to FIG. 6, the approach channel 48 is open at the flanged end of the inner member 40 and defines a ramp 50. Portion 45 is at the same elevation as exterior surface 44. Referring to FIGS. 3 and 5, the free edge 33 of lug 36 is angled toward the flanged end of outer member 30. The channels 48 preferably have perpendicular longitudinal sidewalls to prevent radial slippage of lug 36 during assembly of protector 10. Lug ramp 37 preferably complements approach ramp 50.

To assemble the end protector 10, lugs 36 are aligned with approach channels 48 and the outer member 30, end 35 first, is forced over the inner member 40. The edge 33 of each lug 36 travels along the complementary approach channel 48 until the lug ramp 37 meets the approach ramp 50. As the mating ramps 37 and 50 engage, the continued force applied to press outer member 30 onto inner member 40 deflects portion 45 inward and the lug 36 snaps into locking engagement in recess 52.

The approach channels 48 of the present invention provide an indexing means to ensure proper alignment of each lug 36 with a recess 52 to prevent misalignment of members 30 and 40. In addition, the arrangement described above provides a positive locking engagement which prevents the rotation—that is, radial movement of members 30 and 40 relative to each other—of the inner and outer members relative to each other. Therefore, members 30 and 40 of protector 10 are not susceptible to separation during use, including application to and removal from threaded pipes. The locking engagement of edge 33 against abutment 54 and the cooperation of lip 56 and end 35 prevent axial movement of the members 30 and 40 relative to each other.

Inner member 40 is preferably made of a resilient, durable plastic material, such as high density polyethylene, which can withstand exposure to temperatures ranging from about −50° F. to 150° F. Outer member 30 is made of a rigid material, preferably a metal, such as steel. The metal outer member 30 can be easily and economically produced from steel pipe which is cut to the desired length and pressed into shape. The plastic inner member 40 can be manufactured by injection molding.

FIGS. 7 through 12 illustrate an externally threaded end protector 20. End protector 20 includes outer plastic member 80 having exterior surface 82 and interior surface 84. Threads 86 on the exterior surface 82 engage matching threads on the interior of a pipe coupling (not shown). End protector 20 also includes inner metal member 60 which fits closely against interior surface 84 of outer member 80.

Figure 9:
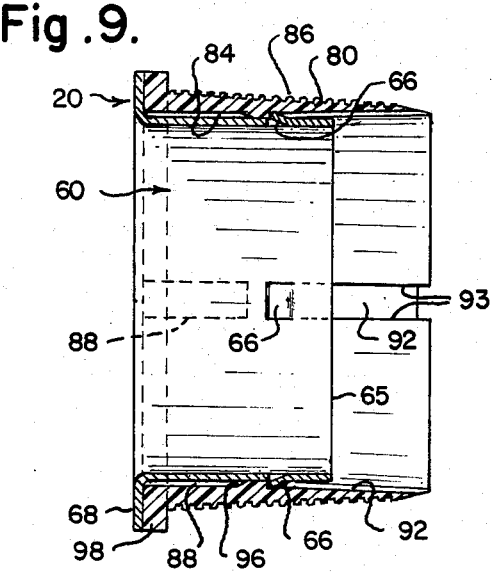
FIG. 9 is a section view of the end protector shown in FIG. 7 taken along the line IX—IX of FIG. 8.
Figure 10:
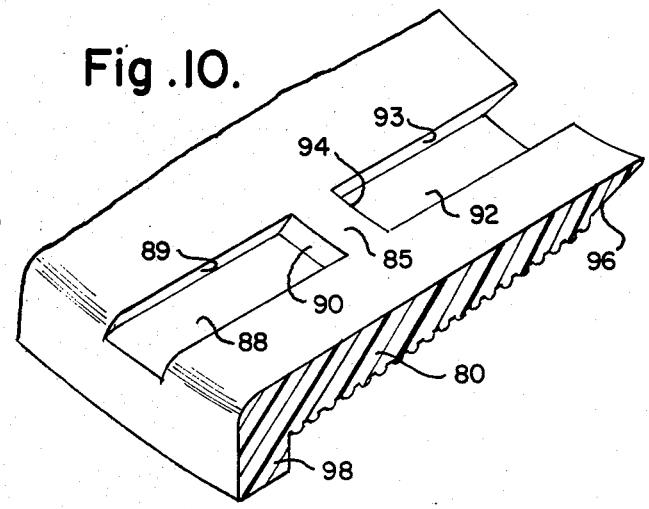
FIG. 10 is an isometric cutaway view of a portion of the plastic member of the protector shown in FIG. 7, showing the approach channel, ramp, and locking recess of the outer plastic member.
Figure 11:
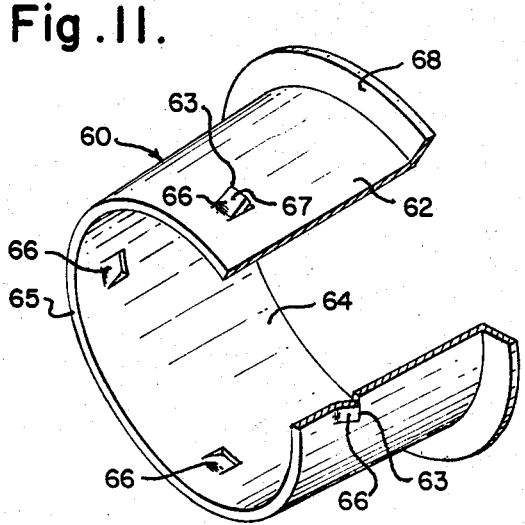
FIG. 11 is an isometric view partially cutaway, of the inner metal member of the end protector shown in FIG. 7.
Figure 12:
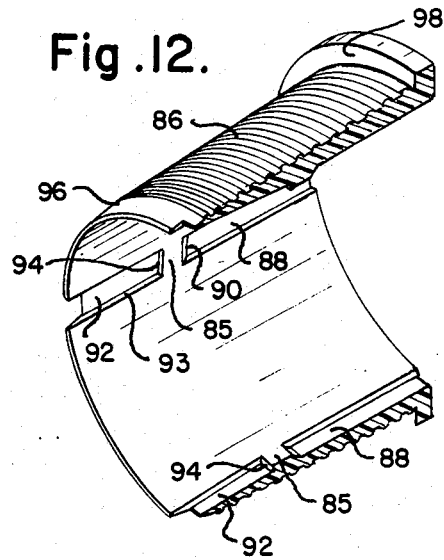
FIG. 12 is an isometric view partially cutaway, of the outer plastic member of the end protector shown in FIG. 7.

Outer member 80 includes approach channels 88, ramps 90, portions 85, locking recess 92, and abutment ends 94. Locking recesses 92 extend to beveled end 96 to facilitate removal of member 30 from the mold during manufacture. Inner member 60 includes interior and exterior surfaces 64 and 62, and lugs 66 with ramp surfaces 67 and free edges 63. The lugs 66 engage channels 88, ramps 90, recesses 92 and abutment 94 in the same manner as their counterparts on exterior end protector 10. Perpendicular side walls 93 of recesses 92 prevent the escape of lugs 62 from recesses 92 in a radial direction. Perpendicular side walls 89 of channels 88 prevent the escape of lugs 62 from channels 88 in a radial direction while members 60 and 80 are being joined together. The stop or flange 68 of inner member 60 engages and covers the stop or flange 68 of outer member 80. As with flange 58, flange 98 can be made "wavy" to enhance the sealing ability of member 80. Therefore, edges 63, walls 94, and flanges 68 and 98 cooperate to prevent axial movement of members 60 and 80 relative to each other after they are joined together. Referring to FIG. 9, end 96 of inner member 80 is beveled. End 65 of outer member 60 need not engage end 96.

What is claimed is:

1. A protector for the threaded end of a generally tubular member comprising:
    a member formed from a resilient material that defines a threaded portion that is adapted to threadedly engage the threaded end of the tubular member; and
    a member formed from metal having a surface adapted to confront a corresponding surface of said resilient member, said metal member defining at least one projection on its said confronting surface;
    said resilient member defining at least one recess adapted to captively receive said projection when said resilient and metal members are placed in predetermined positions relative to each other and said confronting surfaces confront each other, whereby relative rotational movement between said resilient and metal members is prevented;
    said metal member, said resilient member, said projection, and said recess cooperating to secure together said resilient and metal members to form a unit when said projection is received by said recess and said members are in said predetermined positions;
    said resilient member further defining a channel adapted to receive said projection and guide said projection to said recess as said members are moved toward their said predetermined positions.

2. The protector recited by claim 1 wherein said channel defines a ramp that facilitates transfer of said projection from said channel into said recess.

3. The protector recited by claim 1 wherein said metal member defines four said projections and said resilient member defines four said channels and four said recesses so spaced that each said projection is guided by a said channel to a said recess as said members are moved to their said predetermined positions.

4. A protector for the threaded end of a generally tubular member comprising:
    a generally cylindrical plastic member that defines a threaded portion on its inner surface, said threaded portion being adapted to threadedly engage the threaded end of the tubular member; and
    a metal member dimensioned to permit insertion of at least a portion of said plastic member into the interior of said metal member, said metal member defining a projection that extends into the interior of said metal member;
    the outer surface of said plastic member defining a recess adapted to receive said projection when said plastic member is inserted into said metal member to a predetermined extent;
    said plastic member defining a stop portion adapted to engage said metal member to prevent insertion of said plastic member into said metal member beyond a predetermined point;
    said outer surface further defining a channel that is adapted to guide said projection to said recess as said plastic member is inserted into said metal member;
    said projection and said recess being so configured and oriented as to inhibit radial movement of said members relative to each other and to inhibit the passage of said projection from within said recess towards said channel;
    said recess, said projection and said stop portion thereby joining said members together as a unit when said projection is disposed in said recess.

5. The protector recited by claim 4 wherein one end of said channel defines a ramp that facilitates the travel of said projection from said channel into said recess.

6. A protector for the threaded end of a generally tubular member comprising:
    a generally cylindrical plastic member that defines a threaded portion on its outer surface, said threaded portion being adapted to threadedly engage the threaded end of the tubular member; and
    a metal member dimensioned to permit insertion of at least a portion of said metal member into the interior of said plastic member, said metal member defining a projection that extends from the outer surface of said metal member;
    the inner surface of said plastic member defining a recess adapted to receive captively said projection when said metal member is inserted into said plastic member to a predetermined extent;

said plastic member defining a stop portion adapted to engage said metal member to prevent insertion of said metal member within said plastic member beyond a predetermined point;

said inner surface of said plastic member further defining a channel that is adapted to guide said projection toward said recess as said metal member is inserted into said plastic member;

said projection and said recess being so configured and oriented as to inhibit radial movement of said members relative to each other and to inhibit the passage of said projection from within said recess toward said channel;

said recess, said projection and said stop portion thereby joining said members together as a unit when said projection is disposed within said recess.

7. The protector recited by claim 6 wherein one end of said channel defines a ramp adapted to facilitate the travel of said projection from said channel into said recess.

8. In a protector for the threaded end of a generally tubular member, said protector including a plastic sleeve having a threaded portion for threadedly engaging said threaded tubular member and a metal sleeve adapted to be joined coaxially with said plastic sleeve in at least partially overlapping relationship, the improvement comprising:

at least one projection formed on said overlapping portion of said metal sleeve and extending toward said overlapping portion of said plastic sleeve;

a recess formed on said plastic sleeve and adapted to captively receive said projection; and a channel formed on said plastic sleeve in longitudinal alignment with said recess, said channel adapted to guide said projection toward said recess, said channel terminating in a ramp contoured to facilitate the movement of said projection from within said channel to its captive reception within said recess.

* * * * *